Figure 1:
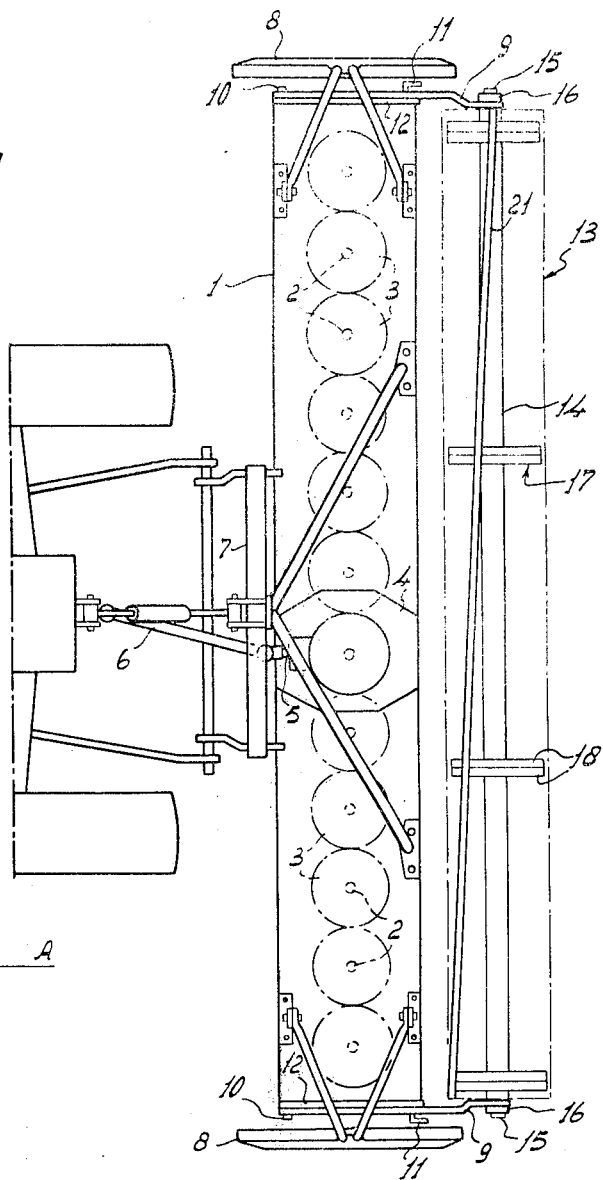

United States Patent [19]
van der Lely

[11] 3,910,356
[45] Oct. 7, 1975

[54] ROTATABLE SOIL ENGAGING ATTACHMENTS

[76] Inventor: Cornelis van der Lely, 7, Bruschenrain, Zug, Switzerland

[22] Filed: Nov. 18, 1974

[21] Appl. No.: 524,883

Related U.S. Application Data

[63] Continuation of Ser. No. 374,796, June 28, 1973, abandoned.

[30] Foreign Application Priority Data

June 29, 1972 Netherlands.................... 7208990

[52] U.S. Cl. .................. 172/552; 172/59; 172/532
[51] Int. Cl.² ........................................ A01B 21/00
[58] Field of Search ....... 172/59, 68, 149, 151, 177, 172/518, 532, 540, 545, 552, 556; 180/20; 305/4; 404/121, 122, 124, 128

[56] References Cited
UNITED STATES PATENTS

| 387,468 | 8/1888 | Weckman............................ 172/552 |
| 466,356 | 1/1892 | Meier.................................. 172/552 |
| 500,418 | 6/1893 | Over................................... 172/552 |
| 502,301 | 8/1893 | Kime................................... 172/545 |
| 1,593,322 | 7/1926 | Williams......................... 172/552 X |
| 2,551,313 | 5/1951 | Brinson............................... 172/556 |
| 3,101,122 | 8/1963 | Robinson............................ 172/556 |
| 3,774,689 | 11/1973 | Lely et al....................... 172/776 X |

FOREIGN PATENTS OR APPLICATIONS

| 108,221 | 10/1967 | Denmark ........................... 172/184 |
| 1,187,840 | 2/1965 | Germany ........................... 172/552 |

Primary Examiner—Clifford D. Crowder
Assistant Examiner—Paul T. Sewell
Attorney, Agent, or Firm—Mason, Mason & Albright

[57] ABSTRACT

An attachment for a cultivator includes an elongated soil engaging roller with longitudinal elements held around the circumference of the roller by supports. The supports are spaced apart profiled plates or pairs of plates having anchorages and apertured lugs alternatively positioned around their peripheries to affix and loosely retain the elements respectively. The elements are helically wound about a central tubular support which forms the axis of rotation for the roller. Alternative elements can be of different cross sections from one another and the elements can be tubes, rods and/or hollow oblong elements. The attachment is mounted to the rear of a cultivator on arms pivoted to the cultivator frame for vertical movements and/or adjustments with respect to rotary soil-working members of the cultivator.

8 Claims, 6 Drawing Figures

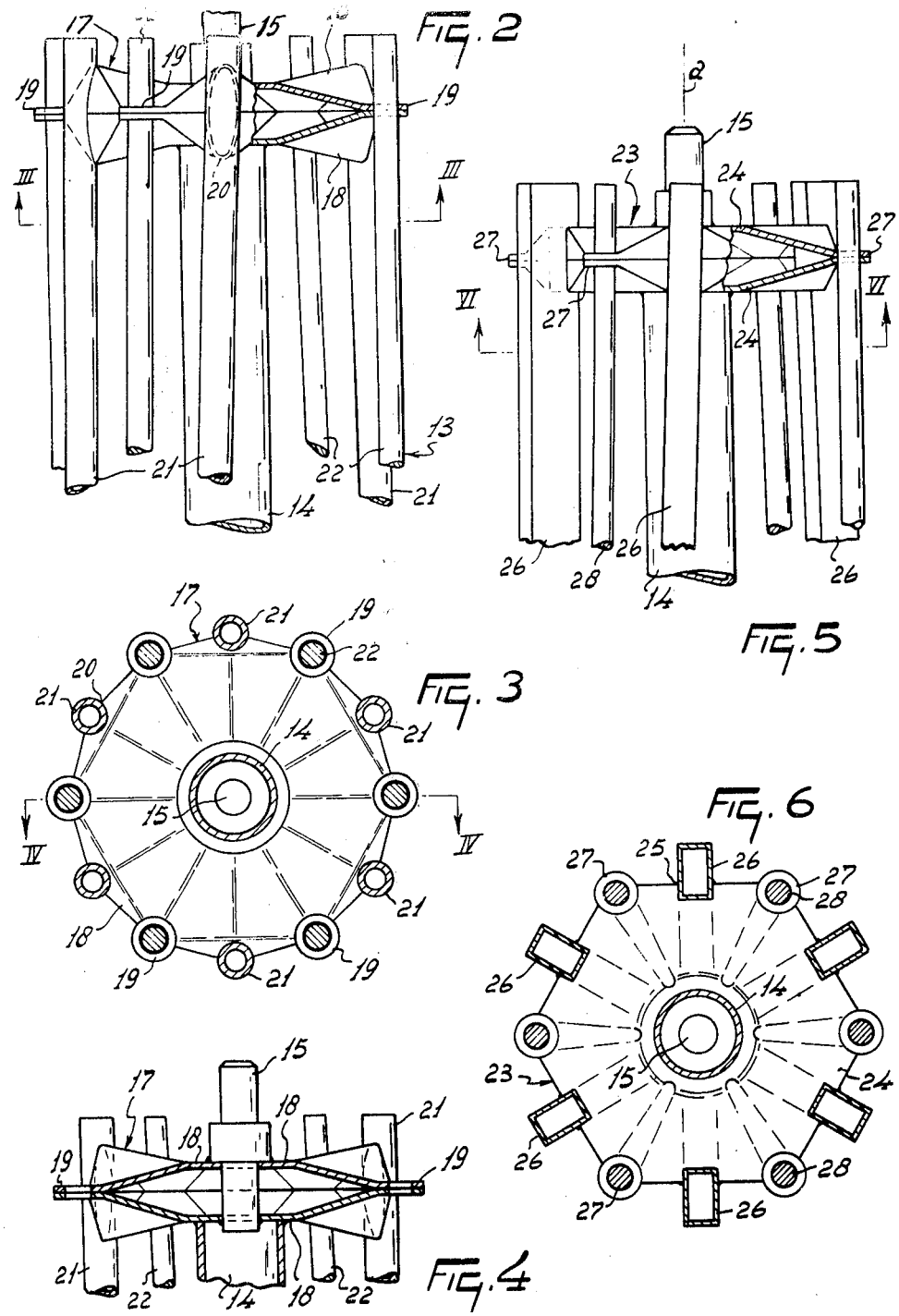

ROTATABLE SOIL ENGAGING ATTACHMENTS

This is a continuation of application Ser. No. 374,796, filed June 28, 1973, now abandoned.

According to the invention, there is provided an attachment of the kind set forth, wherein each support includes at least one profiled plate that is constructed and arranged to define connections for the longitudinal elements at the periphery of that plate.

For a better understanding of the invention, and to show how the same may be carried into effect, reference will now be made, by way of example, to the accompanying drawings, in which:

FIG. 1 is a plan view of a soil cultivating implement or rotary harrow connected to an agricultural tractor and provided at its rear with a rotatable soil engaging attachment in accordance with the invention, FIG. 2 is a part-sectional plan view, to an enlarged scale, illustrating the construction of one end of the attachment of FIG. 1 in greater detail, FIG. 3 is a section taken on the line III—III of FIG. 2, FIG. 4 is a section taken on the line IV—IV of FIG. 3, FIG. 5 corresponds to FIG. 2 but illustrates an alternative construction, and FIG. 6 is a section taken on the line VI—VI of FIG. 5.

Referring to FIGS. 1 to 4 of the drawings, the soil cultivating implement or rotary harrow that is illustrated has a hollow generally box-shaped frame portion 1 that extends substantially horizontally perpendicular to the intended direction of operative travel of the implement that is indicated by an arrow A in FIG. 1 of the drawings. A plurality, such as twelve, of tined soil working members or rotors that are not visible in the drawings are located in an row beneath the hollow frame portion 1 at the low ends of corresponding substantially vertical, or at least upwardly extending, shafts 2. The shafts 2 are rotatably mounted in the frame portion 1 by appropriately positioned substantially vertical bearings and said shafts are provided, internally of the frame portion 1, with corresponding straight- or spur-toothed pinions 3 that extend in a single row with the teeth of each pinion 3 in mesh with those of its neighbour or both of its neighbours. The shafts 2 are spaced apart from one another at regular distances of, preferably, substantially 25 cms. and the corresponding tined soil working members or rotors are arranged to work strips of soil of slightly greater width so that, during operation, those strips overlap one another to produce, in effect, a single broad strip of cultivated or harrowed ground. One of the center pair of shafts 2 of the row thereof has an upward extension into a gear box 4 which gear box contains bevel pinions or other transmission members that place said extension in driven connection with a rotary input shaft 5 of the box that projects forwardly therefrom in a direction substantially parallel to the direction A. The leading splined or otherwise keyed end of the shaft 5 can be placed in driven connection with the power take-off shaft of an agricultural tractor or other operating vehicle by way of an intermediate telescopic transmission shaft 6 of a construction that is known per se having universal joints at its opposite ends. The front of the frame portion 1 with respect to the direction A is provided with a generally triangular coupling member 7 that can be connected to the three-point lifting device or hitch of an agricultural tractor or other operating vehicle in the manner that is shown in outline in FIG. 1 of the drawings.

Plates 8 are arranged near the opposite ends of the row of soil working members or rotors and thus adjacent the opposite lateral ends of the hollow frame portion 1 itself. The plates 8 are normally substantially vertically disposed during the use of the implement and their lower edges are designed to slide over the ground surface in substantially the direction A. The plates 8 are connected by arms to pivotal mountings on top of the frame portion 1, said pivotal mountings defining axes that extend substantially parallel to the direction A so that the plates 8 can move upwardly and downwardly during the operation of the implement to match undulations in the surface of the soil over which it is then travelling. If required, the plates 8 can also be turned upwardly through substantially 180° about their pivotal connections with the frame portion 1 to bring them to inoperative transport positions in which they are inverted to rest on top of the frame portion 1. The plates 8 serve to minimise the formation of ridges of insufficiently crumbled soil at the margins of the path of working travel of the implement and also serve as guards to prevent stones or other potentially dangerous objects from being flung laterally of the implement by the rapidly moving tines of the soil working members or rotors thereof that are located at the opposite ends of the row of such members or rotors. The opposite lateral ends of the hollow frame portion 1 are provided with substantially vertically disposed plates 12 of generally sector-shaped configuration. Arms 9 are turnable upwardly and downwardly alongside these plates 12 about aligned pivots 10 at the top and front of the frame portion 1 with respect to the direction A, said pivots 10 defining a substantially horizontal axis that is substantially perpendicular to the direction A. The rearmost edges of the plates 12 are formed with a plurality of holes that are all equidistant from the axis which has just been mentioned and the arms 9 are formed with single holes that can be brought into register with any chosen holes in the plates 12 and through which registering holes substantially horizontal locking pins 11 can then be entered to retain the arms 9 in the selected angular settings about the pivots 10 relative to the frame portion 1.

A rotatable soil engaging attachment that is generally indicated by the reference 13 is mounted between the lowermost and rearmost ends of the two arms 9 with respect to the direction A. The attachment 13, which is in the general form of an open ground roller, bears upon the surface of the soil during the operation of the implement and thus sustains the frame portion 1 of the implement at a horizontal level above the ground that is determined by the chosen setting of the arms 9 about the axis defined by the pivots 10. This setting is also the primary factor which determines the depth of penetration of the tines of the soil working members or rotors of the implement into the ground. The attachment 13 extends throughout the working width of the tined soil working members or rotors and one of its functions is to act as a rotary soil compressing member by bearing upon the soil just displaced by the foregoing soil working members or rotors thus gently flattening that soil and tending to break up any lumps thereof not sufficiently crumbled by the immediately foregoing tines.

The roller attachment 13 has a central tubular support 14 of circular cross-section which carries aligned stub shafts 15 at its opposite ends. The coincident longitudinal axes of the stub shafts 15 and of the tubular support 14 constitute the axis of rotation $a$ of the roller attachment 13, the two stub shafts 15 being received in substantially horizontal bearings 16 at the ends of the arms 9 so that the axis $a$ extends substantially horizontally perpendicular to the direction A. The stub shafts 15 and the tubular support 14 carry a plurality, such as four, of regularly spaced apart supports 17 each of which is disposed substantially perpendicular to the axis $a$. Each support 17 is afforded by a corresponding pair of symmetrically matching plates 18 that are welded or otherwise rigidly secured to one another. It can be seen from FIG. 3 of the drawings that the plates 18 are formed with lines of deformation that extend substantially radially with respect to the axis $a$. A plurality of substantially triangular regions of deformation are thus formed each of which has its apex adjacent the axis $a$ and its base at the periphery of the corresponding plate. The regions of deformation are so shaped that a substantially conical configuration is defined between facing pairs thereof in the symmetrical plates 18. The plates 18 are provided at their circumference between the regions of deformation with apertured lugs 19. The circumferences of the plates 18 are also shaped to define anchorages 20 that are disposed midway between the lugs 19 in alternate relationship therewith around the axis $a$. Longitudinal elements 21 of tubular formation and circular cross-section are welded in the anchorages 20 that correspond to the spaced apart supports 17 so that each element 21 is wound helically around the axis $a$ as is illustrated for one of those elements in FIG. 1 of the drawings. Further longitudinal elements 22 of solid rod-like configuration and circular cross-section are entered through the apertures in the lugs 19 in a similar helical disposition to the elements 21 but the elements 22 are free to move turnably in the apertures in the lugs 19 and are only prevented from becoming longitudinally disengaged from those lugs by the provision of transverse "safety" pins that are not illustrated in the drawings and that may be of a construction that is known per se.

The described and illustrated formation of the supports 17 is such that they can be manufactured quickly and simply and will allow the fixed longitudinal elements 21 to be secured to the periphery of the roller attachment 13 without difficulty. The anchorages 20 at the bases of the generally conical portions of the supports 17 that have been described above provide, as can be seen in FIG. 4 of the drawings, sufficiently extensive supporting surfaces for the fixed elements 21 to enable those elements to be welded into the anchorages and form a stable assembly that will not readily be deformed by bending. When working on very heavy and/or very wet soil, there is some tendency for the rotatable soil engaging attachment 13 to become filled with mud and other adhering earth. This considerably interferes with the depth control function and flattening effect of the attachment 13 and can be prevented, or greatly reduced, when required, by releasing the "safety" pins that have been mentioned above and temporarily removing the elements 22 by longitudinal displacement through the apertures in the lugs 19. Such removal does not adversely affect the strength of the attachment 13 to any significant extend but allows mud and lumps of earth to fall out much more easily through the peripheral openings between the elements 21 that are substantially double the size of the peripheral openings that exist when both the elements 21 and 22 are present.

FIGS. 5 and 6 of the drawings illustrate an alternative construction of the rotatable soil engaging attachment 13 in which the supports 17 are replaced by supports 23 each of which is in the form of a pair of substantially symmetrical profiled plates 24 that are welded or otherwise secured to one another in symmetrically matching relationship. Anchorages 25 are formed by the profiles of the plates 24 so as to have an appreciable extent in a direction parallel to the axis $a$ as in the case of the previously described anchorages 20 and longitudinal elements 26 are welded or otherwise fixed in said anchorages 25 so as to extend helically around the axis $a$. In this embodiment, each longitudinal element 26 is of tubular formation but oblong cross-section and the boundaries of the anchorages 25 are, of course, shaped to receive this cross-sectional configuration so that the elements 26 can quickly and easily be welded or otherwise secured into the anchorages.

Apertured lugs 27 are provided midway between the anchorages 25 in alternate relationship therewith and, as in the preceding embodiment, solid rod-like longitudinal elements 28 of circular cross-section are entered through the apertures in lugs 27 so as to be turnable relative thereto. Transverse "safety" pins that are not shown in the drawings and that may be of a construction which is known per se are again employed to prevent the movable elements 28 from becoming longitudinally displaced from the apertures in the lugs 27. As in the preceding embodiment, the plates 24 are shaped to define substantially traingular regions of deformation whose apices are close to the axis $a$ and whose bases substantially coincide with the circumferences of the plates 24. In this embodiment, the triangular regions of deformation include the lugs 27 that detachably carry the movable elements 28. The number of longitudinal elements can again be reduced in accordance with the prevailing working conditions, when required, by temporarily removing all, or some, of the elements 28. The rigidly interconnected central tubular support 15, the profiled plates 24 and the fixed longitudinal elements 26 together afford an assembly of great strength and such roller attachments are thus most suitable for employment with implements having large working widths such as 4 ms. or more.

Although certain features of the implement and attachments that have been described and/or illustrated in the accompanying drawings will be set forth in the following claims as inventive features, it is emphasized that the invention is not necessarily limited to those features and that it includes within its scope all of the parts of the implement and each soil engaging attachment that have been described and/or illustrated both individually and in various combinations.

What is claimed is:

1. An attachment for connection to an agricultural implement movable over the ground, comprising an elongated roller having a centrally located axis of rotation and a plurality of longitudinal elements positioned around the circumference of said roller, support means on said roller around said axis of rotation and said support means comprising a plurality of pairs of circular plates, said plates of each pair being secured to one another and defining supports spaced along said axis, said plates having anchorages about their peripheries for securing some of said elongated elements in fixed positions, apertured lugs on said peripheries that receive and retain other said elongated elements, said anchorages each being located between two of said lugs, said apertured lugs loosely holding said other elements and the latter being turnable in their respective apertured lugs and detachable from said attachment.

2. An attachment as claimed in claim 1, wherein those elements secured in said anchorages are oblong in crosssection.

3. An attachment for connection to an agricultural implement movable over the ground, comprising an elongated roller having a centrally located axis of rotation and a plurality of longitudinal elements positioned around the circumference of said roller, support means on said roller around said axis of rotation and said support means comprising a plurality of pairs of circular profiled plates, said plates of each pair being secured to one another and defining supports spaced along said axis, said plates having anchorages about their peripheries for securing some of said elongated elements, said anchorages being at least partly defined by sides of triangular regions of deformation, one side of which is located adjacent the peripheries of the said plates.

4. An attachment as claimed in claim 3, wherein said elements are helically mounted on said pairs of plates across the width of said roller and at least part of said elements being fixed to said anchorages.

5. An attachment as claimed in claim 3, wherein said plates comprise apertured lugs on their peripheries that receive and retain some of said elongated elements, said anchorages each being located between two of said lugs, said apertured lugs loosely holding said other elements and the latter being turnable in their respective apertured lugs and detachable from said attachment.

6. An attachment as claimed in claim 3, wherein said regions of deformation of the plates of a pair are symmetrically matching.

7. An attachment as claimed in claim 6, wherein said regions of deformation of the plates of a pair define anchorages in the form of bases of cones having apices directed toward said axis of rotation.

8. An attachment as claimed in claim 3, wherein said roller is connected to frame and a plurality of soilworking members is rotatably mounted on a portion of said frame to extend in a row that extends transverse to the normal direction of travel of said implement, said roller being located to the rear of said working members.

* * * * *